May 19, 1931.  J. S. REID  1,806,218

CLOSURE

Filed May 27, 1929

INVENTOR
James S. Reid
BY Kwis Hudson & Kent
ATTORNEYS

Patented May 19, 1931

1,806,218

UNITED STATES PATENT OFFICE

JAMES S. REID, OF CLEVELAND, OHIO, ASSIGNOR TO THE EATON AXLE & SPRING COMPANY, OF CLEVELAND, OHIO, A CORPORATION OF OHIO

CLOSURE

Application filed May 27, 1929. Serial No. 366,167.

This invention relates to closure devices and more particularly to a cap member or closure which may be used in connection with the filler necks of fuel tanks and radiators for automobiles and the like.

An object of this invention is to provide a cap member or closure having an improved form of locking means for retaining the cap member on a filler neck.

The invention may be further briefly summarized as consisting in certain novel combinations and arrangements of parts hereinafter described and set out in the appended claims.

In the accompanying sheet of drawings forming a part of this application

Figure 1:
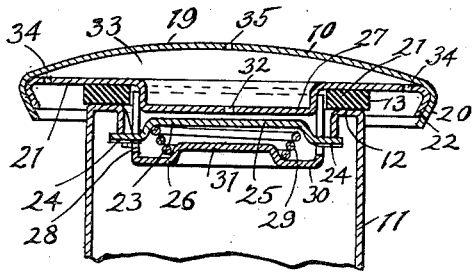
Fig. 1 is a sectional elevation showing my cap member applied to a filler neck.
Figure 3:
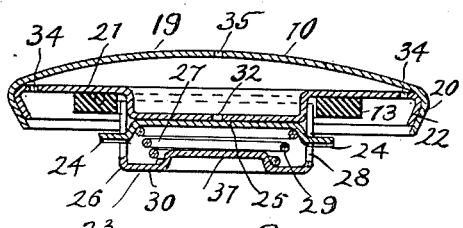
Fig. 3 is a sectional elevation taken on line 3—3 of Fig. 2.
Figure 2:
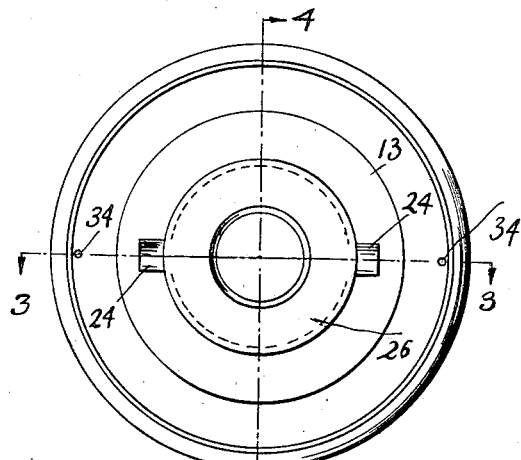
Fig. 2 is a bottom plan view of my cap member.

Referring now to the drawings for a detailed description of my invention, I show my cap member or closure 10 applied to a tubular member or filler neck 11 to close the opening therein. This filler neck is preferably provided at its outer end with a laterally extending flange 12, adapted to form a seat for the gasket 13 and having openings or recesses 14 formed therein. The laterally extending flange 12 is provided with depending flanges 15 upon which are formed cam portions 16 which terminate in dwell portions 17 and abutments 18.

My cap member or closure 10 is adapted to be applied to the outer end of the filler neck, and connected thereto and disconnected therefrom, by rotation relative to said filler neck. The body portion of this cap member comprises a top part 19, which is provided with a depending skirt portion 20, and a bottom part 21 having a flange 22 adapted to be engaged by the depending skirt portion for rigidly and permanently securing these parts together.

For releasably retaining the cap member on the filler neck, I provide a locking member 23, having laterally extending fingers 24 which pass through the openings or recesses 14 when the cap member is applied to the filler neck, and engage the cam portions 16 and the dwell portions 17 and the abutments 18 as the cap member is rotated relative to the filler neck. The locking member is provided with a body portion 25 which is disposed in the extension member 26 carried by the boss 27 formed centrally of the bottom part 21. This extension member is secured to the boss 27 by means of welding or soldering, or by any other suitable means, and is provided with aligned openings 28 in its side wall through which the laterally extending fingers 24 of the locking member 23 extend.

Figure 4:
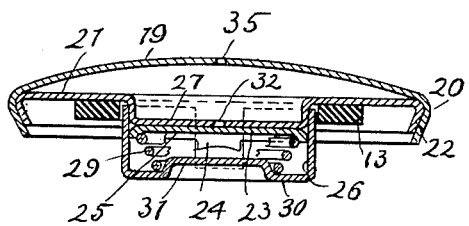
Fig. 4 is a sectional elevation taken on line 4—4 of Fig. 2.
Figure 5:
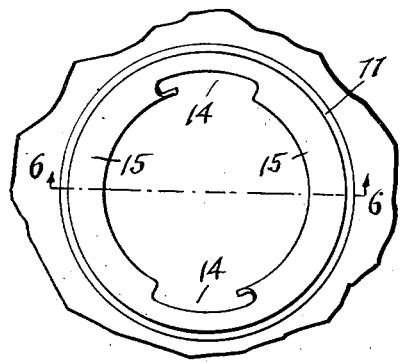
Fig. 5 is a plan view of a filler neck.
Figure 6:
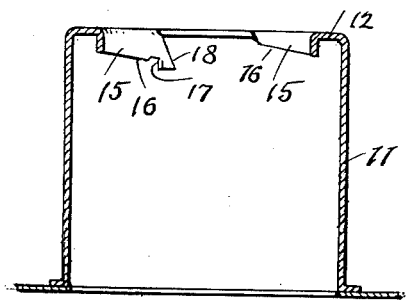
Fig. 6 is a sectional elevation taken on line 6—6 of Fig. 5.

For urging the locking member toward the cam portions 16, that is to say toward the bottom part 21 of the body portion of the cap member, I provide a coiled spring 29 which, as is clearly shown in the drawings, is substantially conical in shape and is interposed between the body portion of the locking member and the bottom wall 30 of the extension member. The bottom wall of the extension member is preferably provided with a raised central portion 31, which is engaged by one end of the spring, and serves as a means for centering the spring. The opposite end of the spring bears against the body portion 25 of the locking member, which, as clearly shown in Fig. 4, is made dish-shaped so as to form a suitable spring plate.

It will now be readily seen that in the arrangement which I have provided the locking member is adapted to be moved axially within the extension member to compress the spring 29, as the fingers of the locking member move along the cam portions 16, when the cap member is applied to the filler neck and rotated thereon. The locking member is guided during this axial movement by the fingers 24 extending laterally through the openings 28 formed in the side wall of the extension member. This extension member also serves as a centering means which greatly facilitates the operation of applying the cap to the filler neck.

A vent opening 32 is provided in the boss 27 of the body portion of the cap. This vent opening is uncovered upon axial movement of the locking member when the cap is applied to the filler neck, and admits air to the container to prevent a vacuum from being formed therein as the contents of the container are being withdrawn. The space 33, between the top part 19 and the bottom part 21, with which the vent opening 32 communicates, is provided with vent passages 34 in the bottom part, and if desired, a vent passage 35 may be provided centrally of the top part. These vent passages serve to connect the space 33 with the atmosphere and prevent the formation of pressure or vacuum in this space.

It will now be readily seen that I have provided a form of locking means whereby my cap member can be quickly and easily applied to a filler neck. The coiled spring which actuates the locking member permits sufficient axial movement to allow the use of gaskets of different thicknesses and, in addition, this spring member insures a constant pressure on the gasket sufficient to maintain an efficient seal and yet insufficient to cause damage to the gasket. Furthermore, by permitting the locking member to move bodily, sufficient axial movement will be provided for this member to permit my closure to be used with filler necks which vary somewhat in dimensions from a standard, without the damage of flexing or bending the locking fingers so that the metal is stressed beyond its elastic limit, as may happen when a cap having a rigidly mounted locking member is applied to a filler neck in which the shape and location of the cam portions do not exactly conform to standard.

While I have shown and described my invention in a detailed manner, it should be understood that I do not limit myself to the precise details shown and described, but regard my invention as including such changes and modifications as do not involve a departure from the spirit and the scope of the appended claims.

Having described my invention, I claim:

1. A closure having a body portion comprising a top part, and a bottom part, said top part having a depending skirt portion, said bottom part having a flange engaged by said skirt portion for holding said parts together, an integral hollow boss formed centrally of said bottom part, a hollow extension member carried by said boss, a substantially rigid locking member disposed in said extension member and having laterally extending fingers, and resilient means for urging said locking member toward said boss.

2. A closure comprising an outer part having a depending marginal flange, an inner part having a portion thereof engaged by said marginal flange for securing said parts together, a hollow extension depending centrally of said inner part, a substantially rigid locking member having a body portion disposed in said extension and having locking fingers projecting through openings in the wall of said extension, and a coiled spring interposed between said body portion and the bottom wall of said extension, said body portion having a depression therein adapted to receive one end of said spring.

3. A closure comprising a cap body having hollow tubular means depending centrally thereof, said tubular means having at the outer end thereof a wall portion forming a spring bearing plate, a substantially rigid locking member movably disposed in said tubular means, said locking member being provided with laterally extending fingers projecting through openings in the side wall of said tubular means and having a central body portion forming a spring bearing plate, and a coiled spring of substantially conical shape having opposite ends thereof in engagement with said spring bearing plates, one of said plates having an integral deformed portion forming spring centering means.

4. A closure comprising a cap body having hollow tubular means depending centrally thereof, said tubular means having at the outer end thereof a wall portion forming a spring bearing plate, a substantially rigid locking member movably disposed in said tubular means, said locking member being provided with laterally extending fingers projecting through openings in the side wall of said tubular means and having a central body portion forming a spring bearing plate, and a coiled spring of substantially conical shape having opposite ends thereof in engagement with said spring bearing plates, said plates having integral deformed portions providing centering means for the ends of said spring.

In testimony whereof, I hereunto affix my signature.

JAMES S. REID.

DISCLAIMER 1,806,218.—*James S. Reid*, Cleveland, Ohio. CLOSURE. Patent dated May 19, 1931.
 Disclaimer filed April 5, 1932, by the assignee, *The Eaton Axle & Spring Company*.

Hereby enters this disclaimer to claim 3 of said patent which is in the following words, to wit:

"A closure comprising a cap body having hollow tubular means depending centrally thereof, said tubular means having at the outer end thereof a wall portion forming a spring bearing plate, a substantially rigid locking member movably disposed in said tubular means, said locking member being provided with laterally extending fingers projecting through openings in the side wall of said tubular means and having a central body portion forming a spring bearing plate, and a coiled spring of substantially conical shape having opposite ends thereof in engagement with said spring bearing plates, one of said plates having an integral deformed portion forming spring centering means."

*(Official Gazette April 26, 1932.)*